May 5, 1959  P. E. RENAUT  2,884,781
APPARATUS FOR ULTRASONIC INSPECTION OF MATERIALS
Filed Sept. 22, 1955

INVENTOR.
PAUL EMILE RENAUT
BY MICHAEL S. STRIKER
ATTORNEY

United States Patent Office 2,884,781
Patented May 5, 1959

2,884,781

APPARATUS FOR ULTRASONIC INSPECTION OF MATERIALS

Paul Emile Renaut, Saint-Maur, France, assignor to "Realisations Ultrasoniques," Saint-Maur, France Application September 22, 1955, Serial No. 535,894

Claims priority, application France September 30, 1954

4 Claims. (Cl. 73—67.8)

This invention relates to ultrasonic inspection of materials, and particularly to measurnig the thickness of solid pieces by means of continuous ultrasonic waves transmitted to the test piece.

According to a well known method, variable frequency ultrasonic vibrations are transmitted, for instance by means of a transmitting piezo-electric transducer, into the test piece having a thickness E; said vibrations are reflected on the back surface of the piece and picked up by a receiving transducer; the ultrasonic power thus picked up by the receiving transducer is very small, except when the frequency of the transmitted ultrasonic vibrations coincide with one of the resonant frequencies of said vibrations in the piece, which implies $$E = k\frac{\lambda}{2} \quad (1)$$

$k$ being an integer, and $\lambda$ the wavelength of the ultrasonic vibrations in the piece.

According to a conventional embodiment of said known principles, there is used one piezo-electric transducer, acting as transmitting and receiving element. This transducer is connected in the plate circuit of an electronic oscillator, the frequency of which is varied according to a certain law. When said frequency coincides with one of the resonant frequencies of the test piece, an important amount of power is absorbed in said piece, which results in an increase of the plate current of the oscillator. The peak of plate current corresponding to said resonant frequency is observed for instance on an ammeter and the frequency of oscillation at the time when said peak is observed is measured, and E is derived from Equation 1. A disadvantage of this method comes from the fact that the peak of plate current is very sharp, and therefore difficult to observe rapidly: this practically prohibits the use of this method in a number of applications, such as direct reading of thickness on the dial of the apparatus. This result may be obtained from certain methods, including frequency modulating the oscillations and displaying the peak of plate current of the screen of a cathode ray tube: but these methods are complicated and corresponding apparatus cumbersome.

It is an object of the invention to provide a simple direct-reading ultrasonic apparatus for instantaneously inspecting materials, and particularly measuring the thickness of solid pieces.

According to the general principles of the invention, there is generated an electric continuous sine wave oscillation, transmitted to the test piece under the form of elastic vibrations by means of a transducer, and the frequency of said electric oscillation is directly controlled by the test piece, whereby said frequency has the value of one of the resonant frequencies of said elastic vibrations in said piece: thus, one has only to connect a frequency-meter at the output of the electronic oscillator for directly reading the resonant frequency of the piece, or its thickness, which is inversely proportional to said frequency; this method of control of the frequency of oscillation of an oscillator by the test piece is somewhat similar to the conventional control of the frequency of an oscillator by a quartz crystal, the assembly comprising the transducer and test piece on which it rests in close contact being substituted for the control crystal.

An apparatus embodying the above discussed general principles of the invention comprises an electronic oscillator comprising an electronic amplifier having an input and an output and a feedback loop connected between said input and said output, said feedback loop comprising an alternating-current bridge, an ultrasonic transducer inserted in said bridge and adapted to transmit ultrasonic vibrations to the test piece, whereby the frequency of oscillation of said oscillator is stabilized to one of the resonant frequencies of the ultrasonic vibrations in said piece.

Any oscillation spontaneously tending to start up at the output of the amplifier, is transmitted to the bridge, and, through the transducer, to the test piece. When the frequency of said starting oscillation is different from the resonant frequencies of the piece, elastic power absorbed in the latter is negligible, and if it is supposed that the bridge was initially balanced, it remains in such condition, and transmits no electric power to the input of the amplifier, therefore stopping the starting oscillation; however, if the frequency of said starting oscillation coincides with one of the resonant frequencies of the piece, amplitude of the elastic vibrations in the latter is considerably increased, and there is introduced a supplementary impedance into the bridge, which is thus unbalanced, and transmits electric energy to the input of the amplifier.

Thus an oscillation can be maintained on such resonant frequency. Of course, it is to be understood that the above explanation of the operation of the disclosed apparatus is given merely for the purpose of exposition, and while this explanation is believed to be correct, it is not of necessity complete, nor the operation of the invention depend upon its accuracy or otherwise.

Other features and advantages of the invention will be apparent from the ensuing description which is given merely by way of example.

Figure 1:
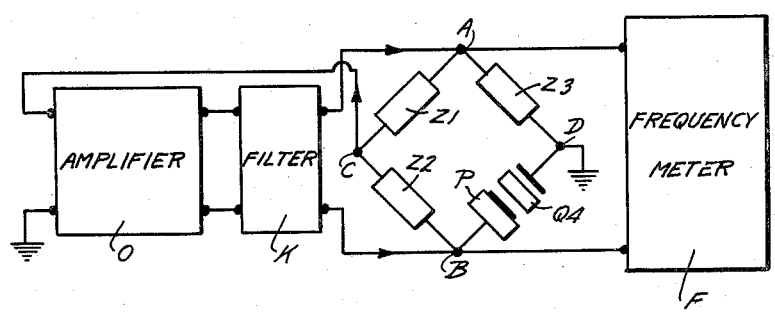
Fig. 1 is a block diagram of a measuring apparatus according to the invention.

Referring particularly now to Fig. 1, at the output of the amplifier O is connected a bridge comprised of identical impedances $Z_1$ and $Z_2$, transducer $Q_4$ in contact with the test piece P, and impedance $Z_3$ the impedance of which is equivalent to that of transducer $Q_4$. The terminals A and B of the bridge are electrically connected to the output of amplifier O whereas terminals C and D are connected to the input of said amplifier. There may be inserted, in series with amplifier O, pass band filters K (such as K, Figure 1) the band pass of which includes only one of the resonant frequencies of ultrasonic vibrations in the test piece; thus electric oscillation is possible only on said selected resonant frequency, which is preferably the fundamental, and then, if $\lambda$ is the wavelength corresponding to the frequency read on the frequency meter F, the thickness of the test piece is given by the equation $$E = \frac{\lambda}{2}$$

Figure 2:
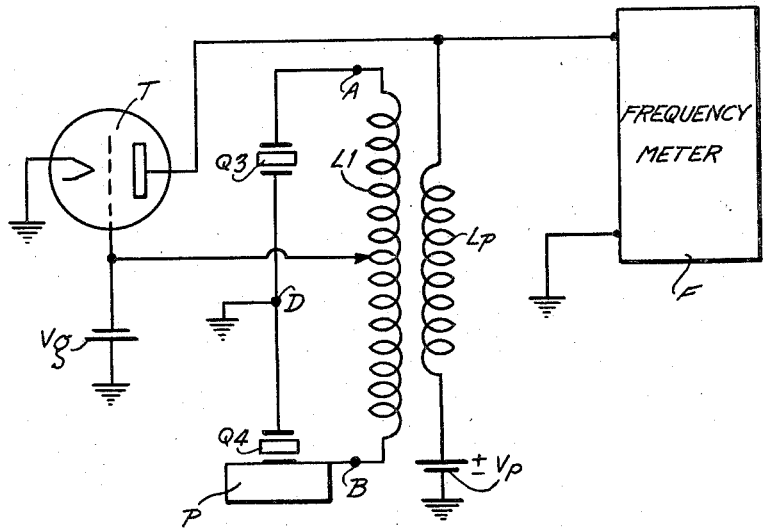
Fig. 2 is a diagrammatic view of a specific embodiment of the apparatus of Fig. 1.

In Fig. 2, the plate circuit of the amplifier vacuum tube T includes a coil $L_p$ symmetrically coupled to identical coils $L_1$ and $L_2$ which constitute a Wheatstone bridge completed by two identical crystal quartz $Q_3$ and $Q_4$, the latter being in contact with the test piece P. $V_g$ and $V_p$ are respectively the grid bias and anodic supply batteries of tube T. F is a direct-reading frequency meter, the dial of which has been calibrated in values of the thickness of the test piece. Like references correspond to the same elements as in Fig. 1, terminals C and D of the bridge being connected by leads to the input of the amplifier, whereas terminals A and B are electrically connected to the output of the amplifier through inductive coupling between coils $L_1$ $L_2$ and coil $L_p$. The operation of the apparatus of Fig. 2 conforms to the general principles above discussed. The resonant frequency of the crystals $Q_3$ or $Q_4$ being 5 mcs. in a non-limiting example, the measuring range of the apparatus may correspond to a fundamental resonant frequency of the test piece comprised between 1 and 4.5 mcs.

The invention is of course not limited to the above decribed illustrative examples.

What I claim is:

1. An apparatus for inspecting materials by means of ultrasonic vibrations transmitted to a test piece comprising, in combination, an electronic oscillator including an electronic amplifier having an input, an output and a feed-back loop connected between said input and said output, said feed-back loop including an alternating current bridge consisting of first and second arms having first and second impedances, respectively, said impedances having substantially the same value, and third and fourth arms having a third impedance and an ultrasonic transducer, respectively, said third impedance and transducer being of substantially the same impedance value, said transducer being adapted to transmit ultrasonic vibrations to the test piece, whereby the frequency of oscillation of said oscillator is one of the resonant frequencies of the ultrasonic vibrations in said test piece.

2. An apparatus for measuring the thickness of solid pieces comprising, in combination, an electronic oscillator including an electronic amplifier having an input, an output and a feed-back loop connected between said input and said output, said feed-back loop comprising a Wheatstone bridge essentially consisting of first and second arms having first and second impedances, respectively, said impedances having substantially the same value, and third and fourth arms having a third impedance and an ultrasonic transducer, respectively, said third impedance and transducer being of substantially the same impedance value, said transducer being adapted to transmit ultrasonic vibrations to the test piece, whereby said bridge is balanced except for oscillations having a frequency equal to one of the resonant frequencies of the ultrasonic vibrations in the test piece, said oscillator thus oscillating at one of said frequencies, and means connected to said output for measuring said frequency of oscillation, indicative of said thickness.

3. An apparatus according to claim 2, further comprising filtering means connected in series with said amplifier and having a band pass including only one of said resonant frequencies.

4. An apparatus according to claim 2, in which said transducer and said third impedance are identical quartz crystals.

References Cited in the file of this patent

UNITED STATES PATENTS

| | | |
|---|---|---|
| 2,178,252 | Forster | Oct. 31, 1939 |
| 2,403,999 | Read et al. | July 16, 1946 |
| 2,431,233 | Erwin | Nov. 18, 1947 |

FOREIGN PATENTS

| | | |
|---|---|---|
| 906,859 | Germany | Mar. 18, 1954 |